(12) United States Patent
Akita et al.

(10) Patent No.: US 8,671,307 B2
(45) Date of Patent: Mar. 11, 2014

(54) TASK RELAY SYSTEM, APPARATUS, AND RECORDING MEDIUM

(75) Inventors: Kazuki Akita, Kawasaki (JP); Takeshi Yamazaki, Kawasaki (JP); Daisuke Shimabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 13/113,241

(22) Filed: May 23, 2011

(65) Prior Publication Data

US 2011/0296233 A1    Dec. 1, 2011

(30) Foreign Application Priority Data

May 28, 2010  (JP) ................................. 2010-122908

(51) Int. Cl.
*G06F 11/00*    (2006.01)

(52) U.S. Cl.
USPC .......................................................... 714/4.1

(58) Field of Classification Search
USPC ............... 714/4.1, 4.11, 4.12, 4.21, 4.3, 6.11, 714/6.12, 6.13, 10–16, 25, 26, 39–41
See application file for complete search history.

(56) References Cited

U.S. PATENT DOCUMENTS

| | | | | |
|---|---|---|---|---|
| 5,469,570 A | * | 11/1995 | Shibata | 717/124 |
| 5,822,531 A | * | 10/1998 | Gorczyca et al. | 709/221 |
| 7,095,747 B2 | * | 8/2006 | Sarmiento et al. | 370/401 |
| 7,260,625 B2 | * | 8/2007 | Sugiura et al. | 709/223 |
| 7,797,572 B2 | * | 9/2010 | Kawashima et al. | 714/5.11 |
| 7,865,763 B2 | * | 1/2011 | Baba et al. | 714/3 |
| 2005/0015657 A1 | * | 1/2005 | Sugiura et al. | 714/6 |
| 2007/0180314 A1 | * | 8/2007 | Kawashima et al. | 714/15 |

FOREIGN PATENT DOCUMENTS

| | | | | |
|---|---|---|---|---|
| GB | 2416875 A | * | 2/2006 | |
| JP | 2003-131892 | | 5/2003 | |

* cited by examiner

*Primary Examiner* — Nadeem Iqbal
(74) *Attorney, Agent, or Firm* — Fujitsu Patent Center

(57) ABSTRACT

A computer which takes over a task managed by a server apparatus from another computer which occupies the task, the computer including, a processor to detect an error of the other computer, to transmit, when an error of the another computer is detected, a task relaying request for taking over the task to the server apparatus, and to allow when a permission of the takeover of the task is received from the server apparatus processes of application programs in standby states in the computer to occupy the task.

5 Claims, 15 Drawing Sheets

FIG. 2

| TASK NAME | TASK ADDRESS | APPLICATION ADDRESS |
|---|---|---|
| TASK B | taskB_address | aplA_address |
| TASK C | taskC_address | aplB_address |
| TASK D | taskD_address | aplC_address |

FIG. 3

| TASK NAME | ADDRESS OF MANAGING UNIT |
|---|---|
| TASK A | — |
| TASK B | crm351_address |

FIG. 4

| TASK NAME | ADDRESS OF MANAGING UNIT |
|---|---|
| TASK C | crm351_address |
| TASK D | crm351_address |

FIG. 6

| TASK NAME | ADDRESS OF MANAGING UNIT |
|---|---|
| TASK A | — |
| TASK B | crm371_address |

FIG. 7

| TASK NAME | ADDRESS OF MANAGING UNIT |
|---|---|
| TASK C | crm371_address |
| TASK D | crm371_address |

FIG. 8

| TASK NAME | SESSION ID | TASK ADDRESS | APPLICATION ADDRESS |
|---|---|---|---|
| TASK B | 123 | taskB_address | aplA_address |
| TASK C | 345 | taskC_address | aplB_address |
| TASK D | 346 | taskD_address | aplC_address |

FIG. 9

| TASK NAME | SESSION ID | EXECUTION PRIORITY | ADDRESS OF MANAGING UNIT |
|---|---|---|---|
| TASK A | – | – | – |
| TASK B | 123 | 1 | crm351_address |

FIG. 10

| TASK NAME | SESSION ID | EXECUTION PRIORITY | ADDRESS OF MANAGING UNIT |
|---|---|---|---|
| TASK C | 345 | 1 | crm351_address |
| TASK D | 346 | 1 | crm351_address |

FIG. 13

| TASK NAME | SESSION ID | EXECUTION PRIORITY | ADDRESS OF MANAGING UNIT |
|---|---|---|---|
| TASK A | — | — | — |
| TASK B | 123 | 2 | crm371_address |

FIG. 14

| TASK NAME | SESSION ID | EXECUTION PRIORITY | ADDRESS OF MANAGING UNIT |
|---|---|---|---|
| TASK C | 345 | 2 | crm371_address |
| TASK D | 346 | 2 | crm371_address |

TASK RELAY SYSTEM, APPARATUS, AND RECORDING MEDIUM

CROSS-REFERENCE TO ASSOCIATED APPLICATIONS

This application is based upon and claims the benefit of priority of the prior Japanese Patent Application No. 2010-122908, filed on May 28, 2010, the entire contents of which are incorporated herein by reference.

FIELD

The embodiment disclosed herein are related to task relaying.

BACKGROUND

In general, in a cluster system including a plurality of processing apparatuses, when, among the processing apparatuses, an active processing apparatus which is performing a process stops for some reason, a standby processing apparatus performs the process instead of the active processing apparatus. In the cluster system in which resources used for execution of processes are shared among the processing apparatuses, when such takeover (or "fail-over") is performed, the resources associated with the processes should be taken over by the standby processing apparatus. Therefore, the takeover of the shared resources should be smoothly performed among the processing apparatuses in order to realize a short operation stop time in the system.

In general, the following technique has been used for managing shared resources in a system. Specifically, a time point when a first task is to be executed next is compared with a time point when a second task which has a priority lower than that of the first task is to be released. Then, when the time point when the first task is to be executed next is earlier than the time point when the second task is to be released, the second task is not allowed to occupy the shared resources. On the other hand, when the time point when the first task is to be executed next is not earlier than the time point when the second task is to be released, the second task is allowed to occupy the shared resources.

In recent years, a number of application programs have been implemented in a processing apparatus so that various services are provided. There arises a problem in that, if the number of application programs associated with takeover is increased, a period of time required for the takeover of shared resources also becomes long.

SUMMARY

According to an aspect of the invention, a computer which takes over a task managed by a server apparatus from another computer which occupies the task, the computer including, a processor to detect an error of the another computer, to transmit, when an error of the other computer is detected, a task relaying request for taking over the task to the server apparatus, and to allow when a permission of the takeover of the task is received from the server apparatus processes of application programs in standby states in the computer to occupy the task.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates data stored in a storage unit;
FIG. 3 illustrates data stored in another storage unit;
FIG. 4 illustrates data stored in a further storage unit;
FIG. 6 illustrates data stored in a storage unit;
FIG. 7 illustrates data stored in another storage unit;
FIG. 8 illustrates data stored in a still another storage unit;
FIG. 9 illustrates data stored in a further storage unit;
FIG. 10 illustrates data stored in a still further storage unit;
FIG. 13 illustrates data stored in a storage unit;
FIG. 14 illustrates data stored in another storage unit.

DESCRIPTION OF EMBODIMENTS

Figure 1:
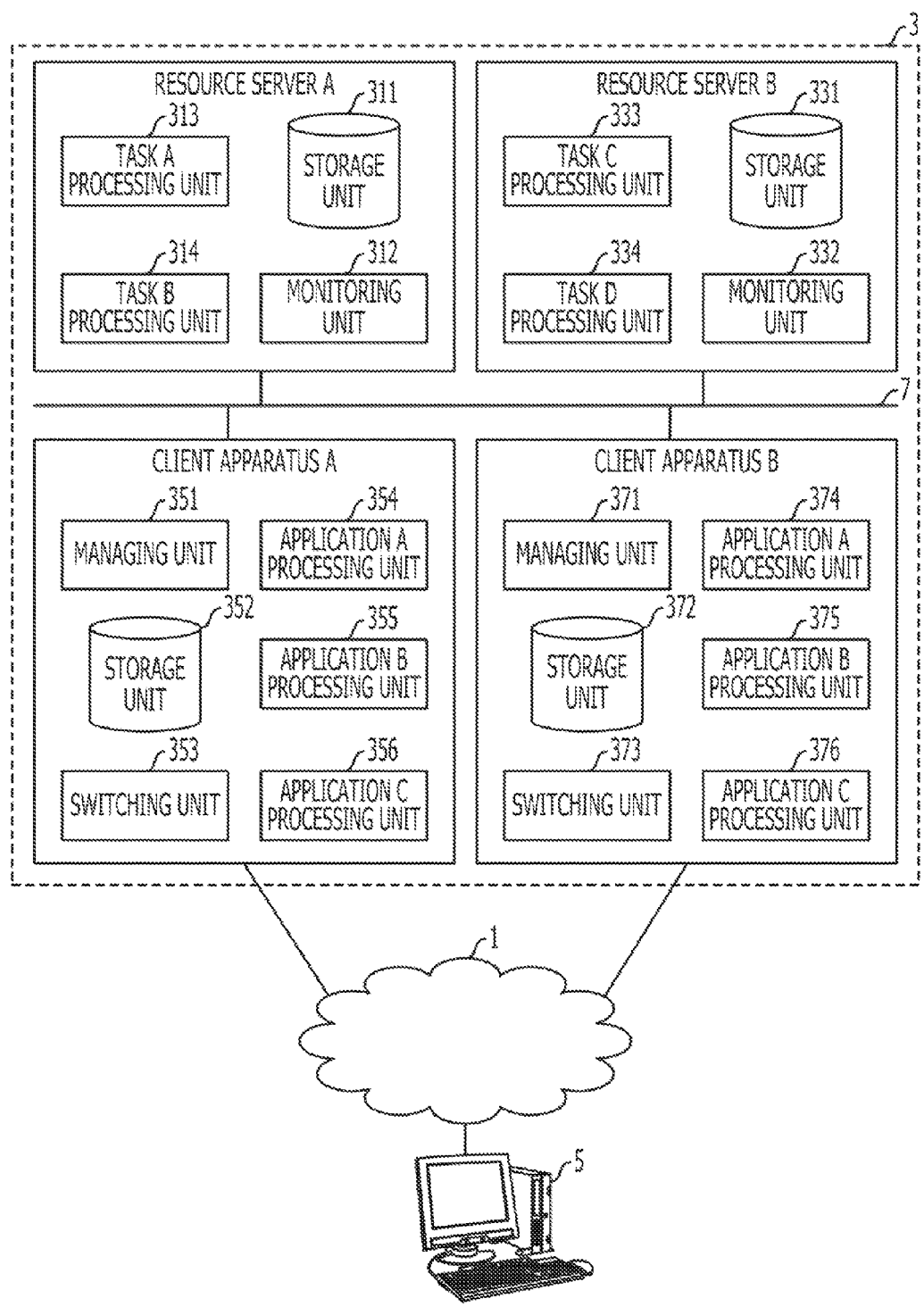
FIG. 1 illustrates a configuration of a system according to a first embodiment.

FIG. 1 illustrates a configuration of a system according to a first embodiment. For example, a terminal device 5 and client apparatuses A and B are connected to a network 1 which may be, for example, the Internet. To the client apparatuses A and B, resource servers A and B which have the sparse relationships with the client apparatuses A and B are connected through a network 7 such as a LAN (Local Area Network). The resource servers A and B and the client apparatuses A and B are included in a cluster system 3. The cluster system 3 executes a process in response to a processing request supplied from the terminal device 5 and transmits a result of the process to the terminal device 5. Note that, although only two client apparatuses and two resource servers are shown in FIG. 1, the number of client apparatuses and the number of resource servers A and B are not limited.

Note that, in the first embodiment, it is assumed that only the client apparatuses A and B use tasks A to D. Furthermore, in a description below, a case where the client apparatus A becomes a hang-up state will be described, and the client apparatus A is not recovered from the hang-up state.

The client apparatus A includes a managing unit 351, a storage unit 352, a switching unit 353, an application A processing unit (354), an application B processing unit (355), and an application C processing unit (356). The client apparatus B includes a managing unit 371, a storage unit 372, a switching unit 373, an application A processing unit (374), an application B processing unit (375), and an application C processing unit (376). The application A of the client apparatus A and the application A of the client apparatus B have the same function. The same is true for the applications B and C. The application A processing unit executes processing of application A, the application B processing unit executes processing of application B, and, the application C processing unit executes processing of application C.

The managing unit 351 performs a process of occupying tasks included in the resource servers A and B instead of the applications A to C, for example. The switching unit 353 communicates with the switching unit 373 included in the client apparatus B and performs a process of monitoring a state of the client apparatus B. The applications A to C are application programs which execute processes using tasks A to D of the resource servers A and B. Note that the managing unit 371, the storage unit 372, the switching unit 373, and the applications A to C included in the client apparatus B are substantially the same as the managing unit 351, the storage unit 352, the switching unit 353, and the applications A to C included in the client apparatus A, respectively, and therefore, descriptions thereof are omitted.

The resource server A includes a task A processing unit (313), a task B processing unit (314), a storage unit 311, and a monitoring unit 312. The resource server B includes a task C processing unit (333), a task D processing unit (334), a storage unit 331, and a monitoring unit 332.

The tasks A to D are processes executed for the applications A to C by the resource servers A and B. The task A processing unit includes resources to execute task A, the task B processing unit includes resources to execute task B, the task C processing unit includes resources to execute task C, and, the task D processing unit includes resources to execute task D. The monitoring units 312 and 332 check errors of communications with the switching units 353 and 373 included in the client apparatuses A and B using heart beats, for example. Note that, in this embodiment, the resource servers A and B recognize communication errors which have occurred when a supply of signals from the client apparatuses A and B are stopped. However, the resource servers A and B may not recognize states (such as a hang-up state) of the client apparatuses A and B.

FIG. 2 illustrates data stored in the storage units 352 and 372. FIG. 2 shows columns of task name, task address, and application address. In this embodiment, the data stored in the storage unit 352 included in the client apparatus A and the data stored in the storage unit 372 included in the client apparatus B are substantially the same as each other.

FIG. 3 illustrates data stored in the storage unit 311 included in the resource server A. FIG. 3 shows columns of task name and address of a managing unit.

FIG. 4 illustrates data stored in the storage unit 331 included in the resource server B. FIG. 4 shows, similarly to FIG. 3, columns of task name and address of a managing unit.

Figure 5:
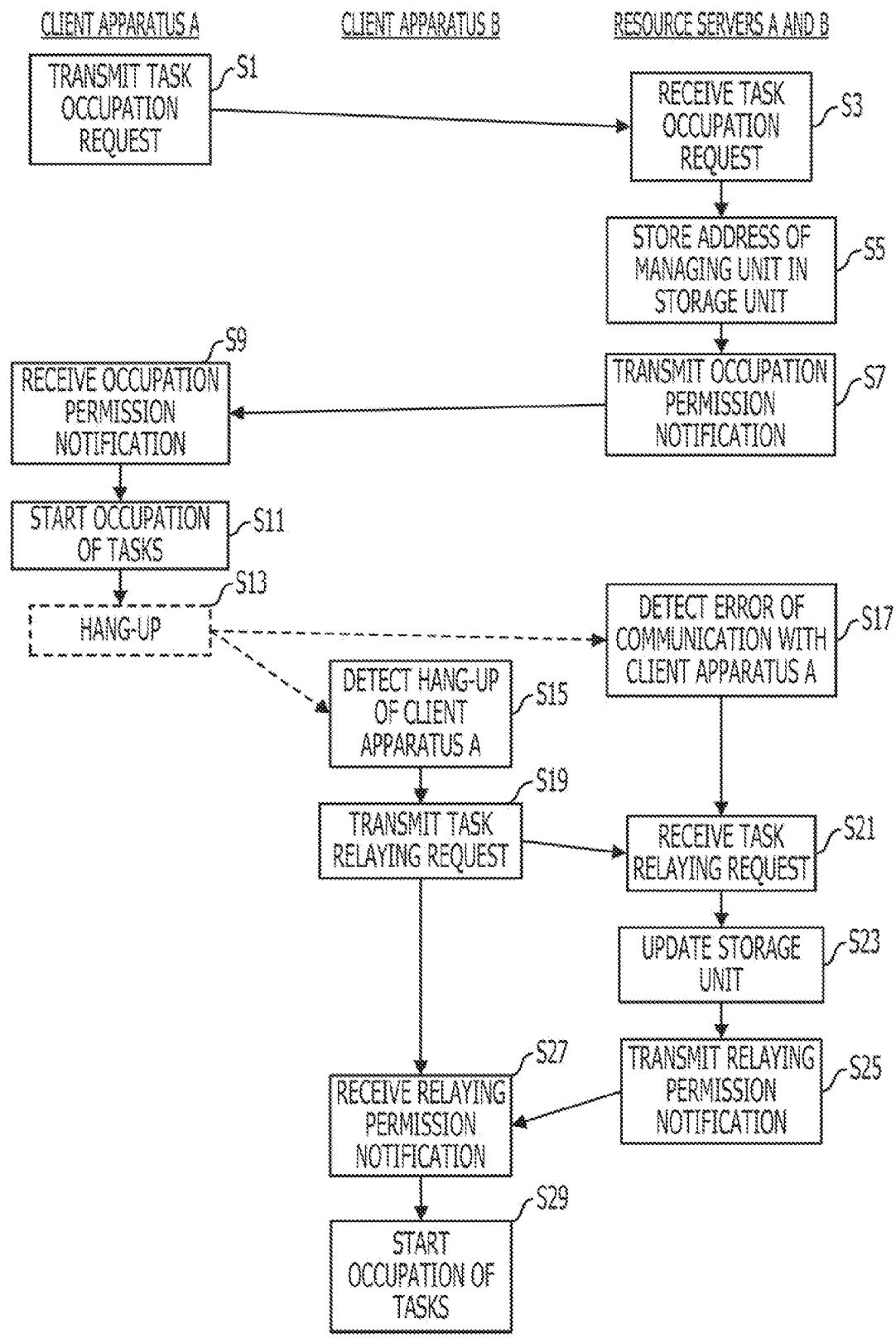
FIG. 5 illustrates a processing flow of a process according to the first embodiment.
Figure 11:
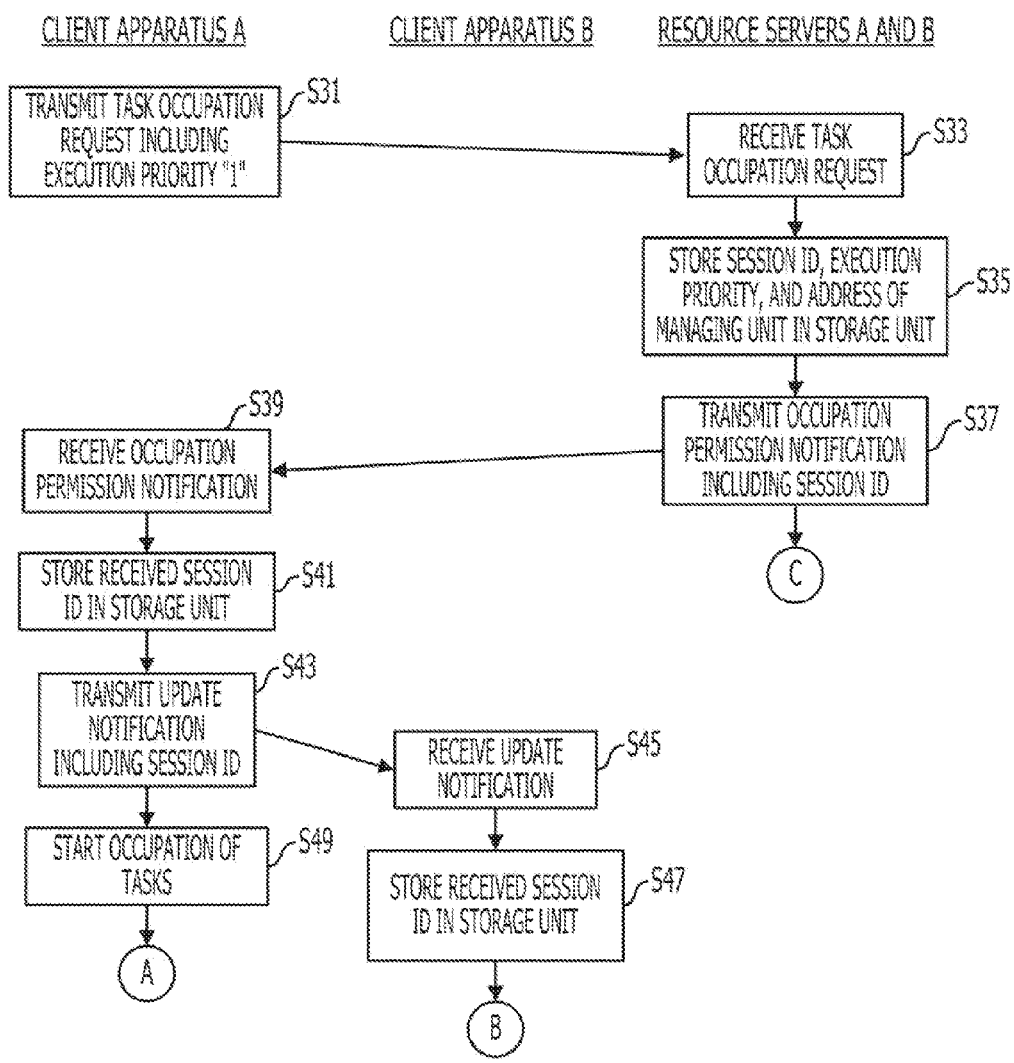
FIG. 11 illustrates a processing flow of a process according to a second embodiment.

Next, a process performed by the system shown in FIG. 1 will be described with reference to FIGS. 5 to 7. First, the managing unit 351 of the client apparatus A transmits a task occupation request to the task B of the resource server A and the tasks C and D of the resource server B using task addresses stored in the storage unit 352 (in S1 of FIG. 5).

The task B of the resource server A receives the task occupation request from the client apparatus A (in S3). The tasks C and D of the resource server B receive the task occupation request from the client apparatus A (in S3).

The task B of the resource server A confirms that an address of a managing unit corresponding to a task name of the task B has not been stored in the storage unit 311, associates an address of the managing unit 351 with the task name of the task B, and stores the address in the storage unit 311 (in S5). The tasks C and D of the resource server B confirm that addresses of managing units corresponding to task names of the tasks C and D have not been stored in the storage unit 331, associate the address of the managing unit 351 with the task names of the tasks C and D, and store the address in the storage unit 331 (in S5).

The task B of the resource server A transmits an occupation permission notification associated with the task B to the managing unit 351 of the client apparatus A (in S7). The tasks C and D of the resource server B transmit occupation permission notifications associated with the tasks C and D to the managing unit 351 of the client apparatus A (in S7). When the operation in S7 is completed, the data illustrated in FIGS. 3 and 4 has been stored in the storage units 311 and 331.

When receiving the occupation permission notifications from the tasks B to D (in S9), the managing unit 351 of the client apparatus A notifies the switching unit 353 of information representing that the occupation (locking) is permitted. Furthermore, the switching unit 353 instructs activation of processes corresponding to the applications A to C which are in standby states. Then, the processes of the applications A to C start processing by occupations of the tasks B to D of the resource servers A and B through the managing unit 351 (in S11).

It is assumed that, thereafter, the client apparatus A hangs-up due to a failure (in S13).

The monitoring unit 312 of the resource server A and the monitoring unit 332 of the resource server B detect an error in a communication with the client apparatus A (in S17). Furthermore, the switching unit 373 of the client apparatus B detects the hang-up of the client apparatus A (in S15) and notifies the managing unit 371 of the hang-up of the client apparatus A.

The managing unit 371 of the client apparatus B transmits a task relaying request to the task B of the resource server A and the tasks C and D of the resource server B using the addresses of the tasks B to D stored in the storage unit 352 (in S19).

The task B of the client apparatus A receives the task relaying request from the client apparatus B (in S21). The tasks C and D of the resource server B receive the task relaying request from the client apparatus B (in S21).

When the error in the communication with the apparatus (the client apparatus A) corresponding to the address of the managing unit 351 which is associated with the task name of the task B and which is stored in the storage unit 311 is detected, the task B of the resource server A replaces the address of the managing unit 351 stored in the storage unit 311 by an address of the managing unit 371 (in S23). When the error in the communication with the apparatus (the client apparatus A) corresponding to the address of the managing unit 351 which is associated with the task names of the tasks C and D and which is stored in the storage unit 311 is detected, the tasks C and D of the resource server B replace the address of the managing unit 351 by the address of the managing unit 371 (in S23). When the operation in S23 is completed, data shown in FIGS. 6 and 7 has been stored in the storage units 311 and 331.

The task B of the resource server A transmits a relaying permission notification to the managing unit 371 of the client apparatus B (in S25). The tasks C and D of the resource server B transmit relaying permission notifications to the managing unit 371 of the client apparatus B (in S25).

When receiving the relaying permission notifications from the tasks B to D (in S27), the managing unit 371 of the client apparatus B notifies the switching unit 373 of information representing that the takeover is permitted. Furthermore, the switching unit 373 instructs activations of the processes corresponding to the applications A to C which are in the standby states. Then, the processes of the applications A to C start processing by occupations of the tasks B to D of the resource servers A and B through the managing unit 371 (in S29). Then, the process is terminated.

As described above, the processes of the applications A to C of the client apparatus B do not individually perform takeover operations but the managing unit 371 performs the takeover operations instead. By this, the takeover operations can be quickly performed and communication loads can be reduced.

Note that, conventionally in some cases, a response from a client apparatus in which a communication error is detected is waited for a certain period of time (several tens of seconds, for example) from when counting is started in the operation of S17, and a relaying request from another apparatus is accepted after the certain period of time. On the other hand, in the process of this embodiment, the takeover can be completed without waiting for a certain period of time to elapse.

Next, a second embodiment will be described. In the second embodiment, takeover of a task is performed using a session identification (ID) or an execution priority.

A configuration of a system according to the second embodiment and functions of units are substantially the same as those of the first embodiment, and therefore, descriptions thereof are omitted.

FIG. 8 illustrates data stored in storage units 352 and 372. FIG. 8 shows columns of task name, session ID, task address, and application address. The storage units 352 and 372 of the second embodiment are different from the storage units 352 and 372 of the first embodiment in that the column of a session ID is included. Note that, also in the second embodiment, the data stored in the storage unit 352 of a client apparatus A and the data stored in the storage unit 372 of a client apparatus B are the same as each other.

FIG. 9 illustrates data stored in a storage unit 311 included in a resource server A. FIG. 9 shows columns of task name, session ID, execution priority, and address of a managing unit. The storage unit 311 of the second embodiment is different from the storage unit 311 of the first embodiment in that the columns of a session ID and an execution priority are included.

FIG. 10 illustrates data stored in a storage unit 331 included in a resource server B. FIG. 10 shows, similarly to the data shown in FIG. 9, columns of task name, session ID, execution priority, and address of a managing unit.

Next, a process performed by the system of the second embodiment will be described with reference to FIGS. 11 to 14. First, a managing unit 351 included in the client apparatus A reads an execution priority ("1", for example, in this embodiment) which is assigned in advance and which is stored in a data storage unit, not shown, and generates a task occupation request including the execution priority. The managing unit 351 transmits the task occupation request to a task B of the resource server A and tasks C and D of the resource server B using addresses of the tasks B to D stored in the storage unit 352 (in S31 of FIG. 11).

Here, the execution priority will be described. The execution priority represents an order of a priority of a client apparatus for occupation of a task. It is assumed that an execution priority of the client apparatus A is "1" and an execution priority of the client apparatus B is "2". In this case, the resource servers A and B determine that the execution priority of the client apparatus B is higher than that of the client apparatus A, and the client apparatus B may preferentially occupy tasks.

Referring back to FIG. 11, the task B of the resource server A receives the task occupation request from the managing unit 351 of the client apparatus A (in S33). The tasks C and D of the resource server B receive the task occupation request from the managing unit 351 of the client apparatus A (in S33).

The task B of the resource server A confirms that an address of a managing unit which is associated with a task name of the task B has not been stored in the storage unit 311, associates an address of the managing unit 351 and the execution priority received in S33 with the task name of the task B, and stores the address and the execution priority in the storage unit 311 (in S35). The tasks C and D of the client apparatus B confirm that an address of a managing unit which is associated with task names of the tasks C and D has not been stored in the storage unit 331, associate an address of the managing unit 351 and the execution priority received in S33 with the task names of the tasks C and D, and store the address and the execution priority in the storage unit 331 (in S35). Furthermore, in S35, the tasks B to D issue respective session IDs which are associated with the corresponding task names and store the session IDs in the storage units 311 and 331. When the operation in S35 is completed, the data shown in FIGS. 9 and 10 has been stored in the storage units 311 and 331.

The task B of the resource server A generates an occupation permission notification including the session ID issued in S35 and transmits the occupation permission notification to the managing unit 351 included in the client apparatus A (in S37). The tasks C and D of the resource server B generate occupation permission notifications including the sessions ID issued in S35 and transmit the occupation permission notifications to the managing unit 351 included in the client apparatus A (in S37).

When receiving the occupation permission notifications from the task B of the resource server A and the tasks C and D of the resource server B (in S39), the managing unit 351 included in the client apparatus A notifies a switching unit 353 of the permissions of occupation. Furthermore, the managing unit 351 associates the session IDs received in S39 with the task names of the tasks which have issued the session IDs and stores the session IDs in the storage unit 352 (in S41). The managing unit 351 generates an updating notification including the session IDs received in S39 and transmits the updating notification to a managing unit 371 of the client apparatus B (in S43). Note that if a client apparatus which may take over the task B of the resource server A and the tasks C and D of the resource server B exists other than the client apparatus B, the updating notification is also supplied to the client apparatus.

The switching unit 353 included in the client apparatus A instructs activation of processes of applications A to C which are in standby states. The processes of the applications A to C start occupation of the tasks B to D of the resource servers A and B through the managing unit 351 (in S49).

On the other hand, the managing unit 371 of the client apparatus B receives the updating notification from the managing unit 351 of the client apparatus A (in S45). The managing unit 371 associates the session IDs received in S45 with the task names of the corresponding tasks B to D which have issued the session IDs and stores the session IDs (in S47). The process proceeds to a process shown in FIG. 12 through terminals A to C.

Figure 12:
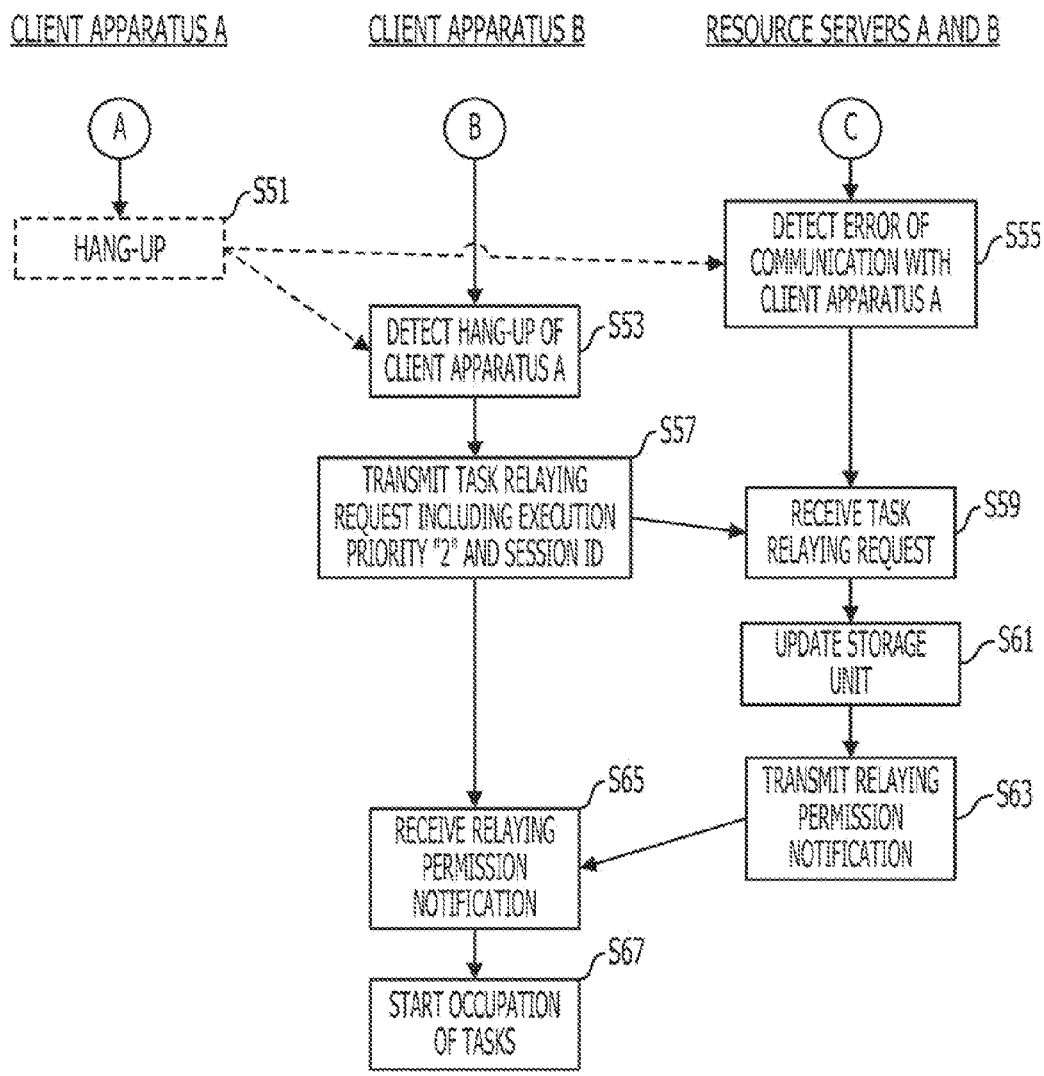
FIG. 12 illustrates the processing flow of the process according the second embodiment.
Figure 15:
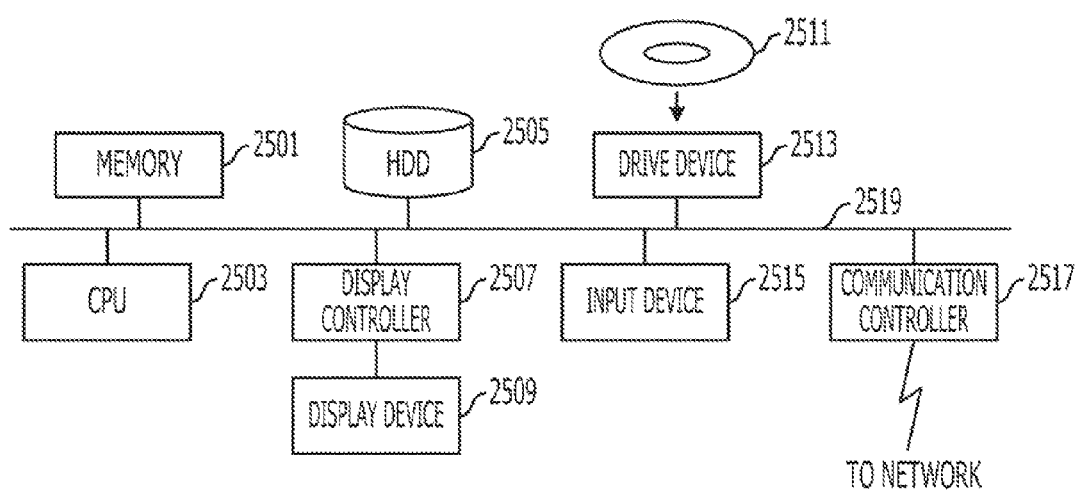
FIG. 15 illustrates functional blocks of a computer.

Referring to FIG. 12, the process following the terminals A to C will be described. It is assumed that the client apparatus A hangs up due to a failure (in S51). A monitoring unit 312 of the resource server A and a monitoring unit 332 of the resource server B detect an error in a communication with the client apparatus A (in S55). Furthermore, a switching unit 373 included in the client apparatus B detects the hang-up of the client apparatus A (in S53) and notifies the managing unit 371 of the hang-up of the client apparatus A.

The managing unit 371 of the client apparatus B reads execution priorities and session IDs from the storage unit 372 and generates a task relaying request including the execution priorities and the session IDs. It is assumed that the execution priorities are "2" in this embodiment. The managing unit 371 transmits the task relaying request to the task B of the resource server A and the tasks C and D of the resource server B using the addresses of the tasks B to D stored in the storage unit 372 (in S57).

The task B of the resource server A receives the task relaying request from the managing unit 371 included in the client apparatus B (in S59). The tasks C and D of the resource server B receive the task relaying request from the managing unit 371 included in the client apparatus B (in S59).

The task B of the resource server A confirms that the session ID received in S59 coincides with the session ID stored in the storage unit 311. Furthermore, the task B of the resource server A confirms that the execution priority received in S59 is higher than the execution priority stored in the storage unit 311 (that is, a number of the execution priority received in S59 is larger than a number of the execution priority stored in the storage unit 311). The task B of the resource server A replaces an address of the managing unit which is associated with the task name of the task B and which has been stored in the storage unit 311 by an address of the managing unit 371 (in S61). The tasks C and D of the resource server B confirm that the session IDs received in S59 coincide with the session IDs stored in the storage unit 331. Furthermore, the tasks C and D of the resource server B confirm that the execution priorities received in S59 are higher than the execution priorities stored in the storage unit 331. The tasks C and D of the resource server B replace the address of the managing unit 351 which is associated with the task names of the tasks C and D and which has been stored in the storage unit 331 by the address of the managing unit 371 (in S61). When the operation in S61 is completed, data shown in FIGS. 13 and 14 has been stored in the storage units 311 and 331.

The task B of the resource server A transmits a relaying permission notification to the managing unit 371 of the client apparatus B (in S63). The tasks C and D of the resource server B transmit relaying permission notifications to the managing unit 371 of the client apparatus B (in S63).

When receiving the relaying permission notifications from the tasks B to D (in S65), the managing unit 371 of the client apparatus B notifies the switching unit 373 of the permission of the takeover. Furthermore, the managing unit 371 instructs activation of the processes of the applications A to C. The processes of the applications A to C start occupation of the tasks B to D of the resource servers A and B through the managing unit 371 (in S67). Then, the process is terminated.

By performing the process described above, the takeover of the tasks from the client apparatus A to the client apparatus B can be quickly performed. Furthermore, since a resource server recognizes a task to be taken over using a session ID, interruption performed by a client apparatus which should not take over the task is reduced or prevented. Moreover, in the example described above, the resource server permits the takeover after confirming the high priority. Therefore, even if the client apparatus A which recovered from the hang-up state requests restart of occupation after the takeover to the client apparatus B is performed, the client apparatus A is not allowed to occupy the tasks.

The embodiments of this technique have been described hereinabove, but this technique is not limited to these. For example, it is not necessarily the case that the diagram of the functional blocks of the client apparatuses A and B and the resource servers A and B described above corresponds to a configuration of an actual program module.

Furthermore, the configurations of the tables described above are merely examples, and configurations of the tables are not limited to the configurations described above. Moreover, in the processing flows, the order of the operations may be rearranged as long as results of the processes are not changed. Furthermore, the operations may be performed in parallel.

For example, although the managing units are included in the respective client apparatuses in the foregoing examples, a plurality of managing units may be included in each of the client apparatuses. In this case, data stored in a storage unit is shared among the plurality of managing units.

Furthermore, although the process is performed using the execution priorities and the session IDs in the second embodiment, the process may be performed without using the session IDs. Note that, this case is effective when only the client apparatuses A and B use the tasks included in the resource servers A and B.

Conversely, the process may be performed only using the session IDs without using the execution priorities. Note that this case is effective when the client apparatus A will not be recovered from the hang-up state or when the client apparatus A is separated from the network even if the client apparatus A is recovered.

Furthermore, timings when the client apparatuses are activated may be shifted from each other and time stamps obtained when the client apparatuses are activated may be used as the execution priorities.

Moreover, although the session IDs are used to determine one of the client apparatuses which takes over the tasks in the foregoing example, data (virtual IP addresses, for example) stored in common in a plurality of client apparatuses which realize a redundant configuration may be used.

Note that, in each of the client apparatuses A and B and the resource servers A and B, a memory 2501 (storage unit), a CPU 2503 (processor), a hard disk drive (HDD) 2505, a display controller 2507 connected to a display device 2509, a drive device 2513 for a removable disk 2511, an input device 2515, and a communication controller 2517 used for connection to the network are connected to one another through a bus 2519. Application programs including an OS and a web browser are stored in the HDD 2505. When the application programs are to be executed by the CPU 2503, the application programs are read from the HDD 2505 to the memory 2501. The CPU 2503 instructs the display controller 2507, the communication controller 2517, and the drive device 2513 to perform appropriate operations as needed. Furthermore, data which is being processed is stored in the memory 2501 or stored in the HDD 2505 if necessary. Such a computer realizes the various functions described above by organically operating the hardware including the CPU 2503 and the memory 2501 described above and required application programs in cooperation.

The embodiments of this technique described above will be described again hereinafter.

This task takeover method is executed for takeover from an active processing apparatus which occupies a task of a server to a standby processing apparatus which is to perform the takeover of the task of the server. This task relaying method includes a request of transmitting, when an occurrence of an error in the active processing apparatus is detected, a task relaying request for takeover of the task of the server to the server, instead of a process of an application program which is in a standby state included in the standby processing apparatus, and notifying the process of the application program which is in the standby state and which is included in the standby processing apparatus of information representing that the task of the server may be occupied when a task relaying permission is received from the server.

By this, even when a large number of processes of application programs use the tasks of the server, the takeover is quickly performed. In addition, communication loads can be reduced.

Furthermore, receiving identification data representing a standby processing apparatus which may take over the task of the server from the active processing apparatus before an occurrence of an error of the active processing apparatus is detected and storing the identification data in a first data storage unit may be included. The requesting described above may include reading, when an error is detected in the active processing apparatus, the identification data from the first data storage unit and generating a relaying request including the identification data may be included. By this, since the server can recognize the standby processing apparatus which may take over the task, interruption performed by a standby processing apparatus which may not take over the task can be reduced or prevented.

Furthermore, the request described above may include reading, when the error is detected in the active processing apparatus, a priority from a second data storage unit which stores priorities representing an order of priorities for occupation of a task of the server and generating a relaying request including the priority. The priority of the active processing apparatus may be higher than the standby processing apparatus. With this configuration, a determination as to whether the takeover is permitted can be made in accordance with a task-occupation priority order. For example, when a processing apparatus which has a low priority (that is, a processing apparatus which is used to be an active processing apparatus) requests occupation of a task after a task takeover is performed once, it may be determined that the occupation of the task is not permitted.

A computer system according to the embodiments of this technique includes a server, a first processing apparatus, and a second processing apparatus. The server described above executes a task which realizes a certain function. Furthermore, the first processing apparatus includes a monitoring unit which detects an error which occurred in the second processing apparatus which occupies the task, and a managing unit which transmits a relaying request for takeover of the task when the monitoring unit detects an error which occurred in the second processing apparatus and which notifies a process of an application program which is in a standby state in the first processing apparatus of information representing that the task may be occupied when a task relaying permission is received from the server. The server may realize a function of collectively transmitting relaying permissions to processes of application programs which are in standby states in the first processing apparatus when the task described above received the relaying request from the first processing apparatus.

With this configuration, even when a number of application programs have been installed in the first and second processing apparatuses, takeover can be speedily performed. That is, takeover of resources shared among a plurality of processing apparatuses which realize a redundant configuration can be speedily performed.

Note that a program which causes a computer to perform the process in the foregoing method may be generated. In this case, the program is stored in a computer-readable storage medium such as a flexible disk, a CD-ROM (Compact Disc Read Only Memory), a magneto-optical disc, a semiconductor memory, or a hard disk or a storage device. Note that an intermediate processing result is temporarily stored in a storage device such as a main memory.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a task relaying program for causing a computer, which takes over a task managed by a server apparatus from another computer which occupies the task, to execute a procedure, the procedure comprising:
   receiving, before an error of the another computer is detected, data representing that the computer is allowed to take over the task from the another computer;
   transmitting, when the error of the another computer is detected, a request for taking over the task to the server apparatus; and
   allowing, when a permission of takeover of the task is received from the server apparatus in response to the transmitting the request, processes of application programs in standby states in the computer to occupy the task.

2. The medium according to claim 1 wherein the procedure further comprises:
   storing the data in a first data storage unit;
   reading the data from the first data storage unit when the error is detected; and
   generating a request including the data.

3. The medium according to claim 1, wherein the procedure further comprises:
   reading a priority level from a second data storage unit which stores priority levels representing priority levels of occupation of tasks managed by the server apparatus when the error of the another computer which is in an active state is detected; and
   generating a request including the priority level,
   wherein a priority level higher than that of the computer is given to the another computer.

4. A computer which takes over a task managed by a server apparatus from another computer which occupies the task, the computer comprising:
   a processor to receive, before an error of the another computer is detected, data representing that the computer is allowed to take over the task from the another computer, to detect the error of the another computer, to transmit, when an error of the another computer is detected, a task relaying request for taking over the task to the server apparatus, and to allow when a permission of the takeover of the task is received from the server apparatus processes of application programs in standby states in the computer to occupy the task.

5. A task relaying system comprising:
   a first computer;
   a second computer; and
   a third computer;
   wherein the first computer comprises a processor to receive, before an error of the second computer is detected, data representing that the computer is allowed to take over the task from the second computer, to detect the error of the second computer which executes a task managed by the third computer, to transmit, when the error is detected, a request for taking over the task to the third computer, and to allow, when a permission of the takeover of the task is received from the third computer, processes of application programs in standby states in the first computer to occupy the task; and wherein, when the third computer receives the request from the first computer, the third computer transmits the permission to the processes of the application programs in standby states in the first computer.

\* \* \* \* \*